United States Patent [19]

Robaszkiewicz

[11] 3,731,765

[45] May 8, 1973

[54] MULTIPLE DIGITAL COMPARATOR

[75] Inventor: Gerald D. Robaszkiewicz, Toledo, Ohio

[73] Assignee: Reliance Electric Company, Euclid, Ohio

[22] Filed: June 9, 1971

[21] Appl. No.: 151,437

[52] U.S. Cl. ..............................187/29 R, 340/146.2

[51] Int. Cl. ...............................................B66b 1/18

[58] Field of Search .....................187/29; 340/146.2, 340/147

[56] References Cited

UNITED STATES PATENTS

| | | | |
|---|---|---|---|
| 3,316,535 | 4/1967 | Fought | 340/146.2 |
| 3,289,159 | 11/1966 | Woodward, Jr. | 340/146.2 |
| 3,511,342 | 5/1970 | Hall et al. | 187/29 |

*Primary Examiner*—Bernard A. Gilheany
*Assistant Examiner*—W. E. Duncanson, Jr.
*Attorney*—Wilson & Fraser

[57] ABSTRACT

A multiple digital comparator for ascertaining the largest or smallest count in a plurality of counters by progressively scanning all of the counter's outputs from the most to least significant bits and rejecting those counters having bits set when other counters have those bits reset for the least count selection and by progressively scanning all the counter's outputs from the most significant bit to the least significant bit while rejecting those counters having bits reset when other counters have those bits set for the selection of the counter with the greatest count. Equal counts can be accommodated by an order of preference of selection so that only one counter is selected as having the least or greatest count. The comparator is illustrated for the selection of the least count as accumulated in counters individual to elevator cars whereby the car best situated to serve a call receives an assignment of that call.

18 Claims, 2 Drawing Figures

CAS3

INVENTOR.
GERALD D. ROBASZKIEWICZ
BY Wilson & Fraser
ATTORNEYS

SRCN2

INVENTOR.
GERALD D. ROBASZKIEWICZ
BY
Wilson + Fraser
ATTORNEYS

MULTIPLE DIGITAL COMPARATOR

CROSS-REFERENCE TO RELATED APPLICATIONS

This invention has been disclosed as an element of an elevator system disclosed in G. D. Robaszkiewicz U.S. Pat. application Ser. No. 151,778 filed herewith and entitled "Elevator Control For Optimizing Allotment of Individual Hall Calls to Individual Cars" and is related to Robert J. Lauer patent application for "Elevator Car Stopping Status Evaluating Means", Ser. No. 151,861 filed herewith.

BACKGROUND OF THE INVENTION

1. Field of the Invention

This invention relates to multiple digital comparators and more particularly to comparators for comparing any number of binary counts to ascertain the least or the greatest count.

2. Description of the Prior Art

Heretofore digital comparators have been known to compare two digital counts and identify the larger or smaller. The present invention permits comparison of any number of digital counts having any number of significant bits.

SUMMARY OF THE INVENTION

A plurality of binary counts have their digits scanned simultaneously beginning with the most significant digit to select the first count exclusively having a significant digit thereby identifying the greatest count. Conversely, the least count can be selected by a scan of count bits from the most to least significant rejecting those counts having a significant digit which another count does not have until only one count remains unrejected. Scanning of the counts is by a ring counter which applies enabling signals selectively to gates for the like count bits of the several counts. When applied to a plurality of counters, each gated bit level gates or inhibits, depending upon the selection sought, a rejection circuit which is effective to reject counters when at least one counter has a count which is not to be rejected. When all but one counter has been rejected the unrejected counter is identified as having the desired count.

In the following detailed description the invention will be illustrated for selection of the lowest count in a number of counters. In actual practice it has been employed in an elevator system which has a twelve stage binary counter for each of eight elevator cars and wherein service burden delays imposed on the cars in serving a hall call are represented for each delay factor as pulse trains accumulated in the respective car's counter. Thus, the car with the lowest count is the car with the least service delay to the hall call and therefore the car which should be assigned the hall call. The mechanisms for identifying that car are illustrated together with preference circuits which avoid assignment of a hall call to two cars having the same low count. Preference is established in a predetermined sequence of the counters and thus the cars where equal counts are compared.

DESCRIPTION OF THE PREFERRED EMBODIMENT

Figure 1:
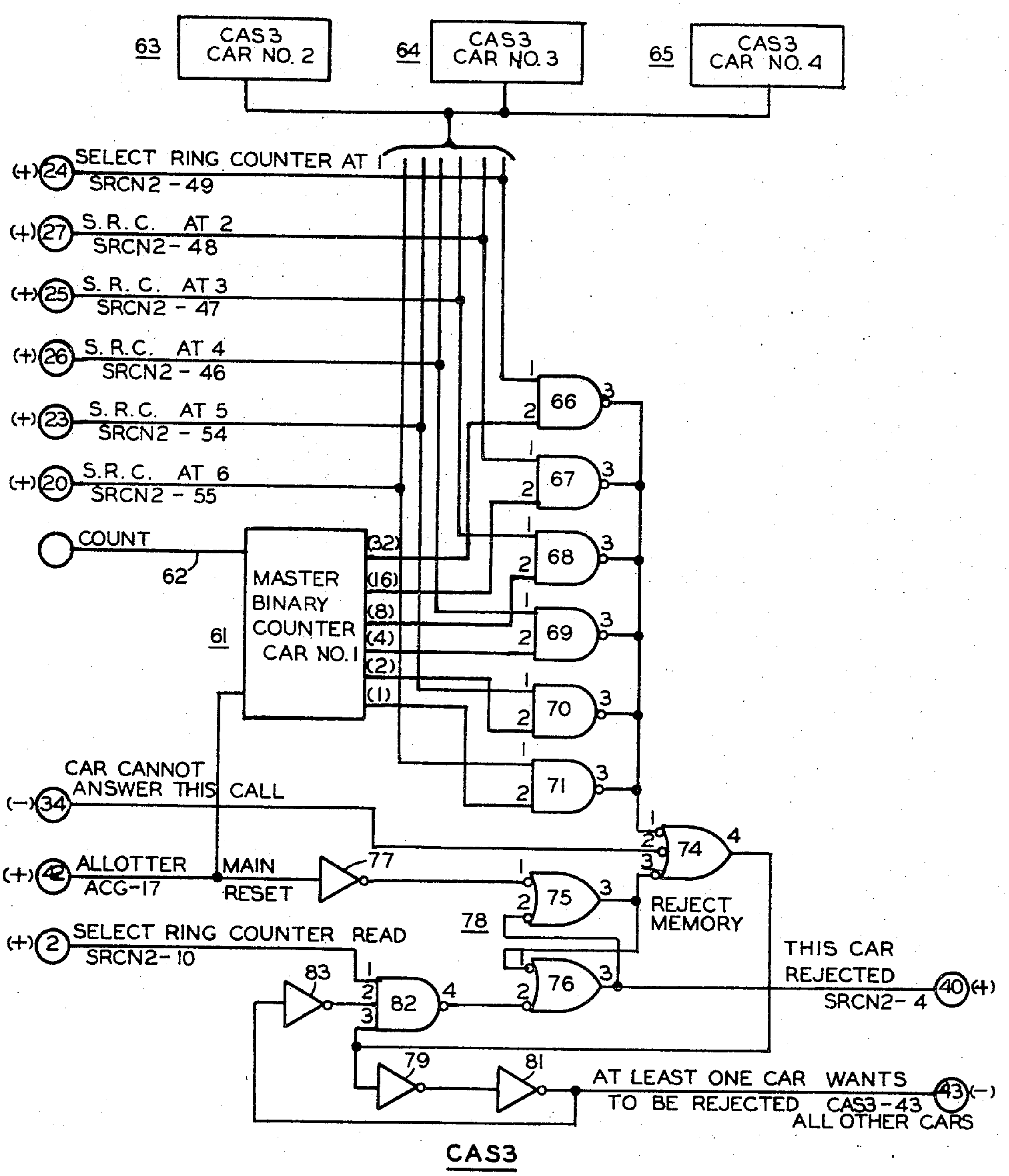
FIG. 1 is an abbreviated logic diagram of the counter comparison gates and reject memory for one counter and representations in block diagram form of additional counters with their comparison gates and reject memories.
Figure 2:
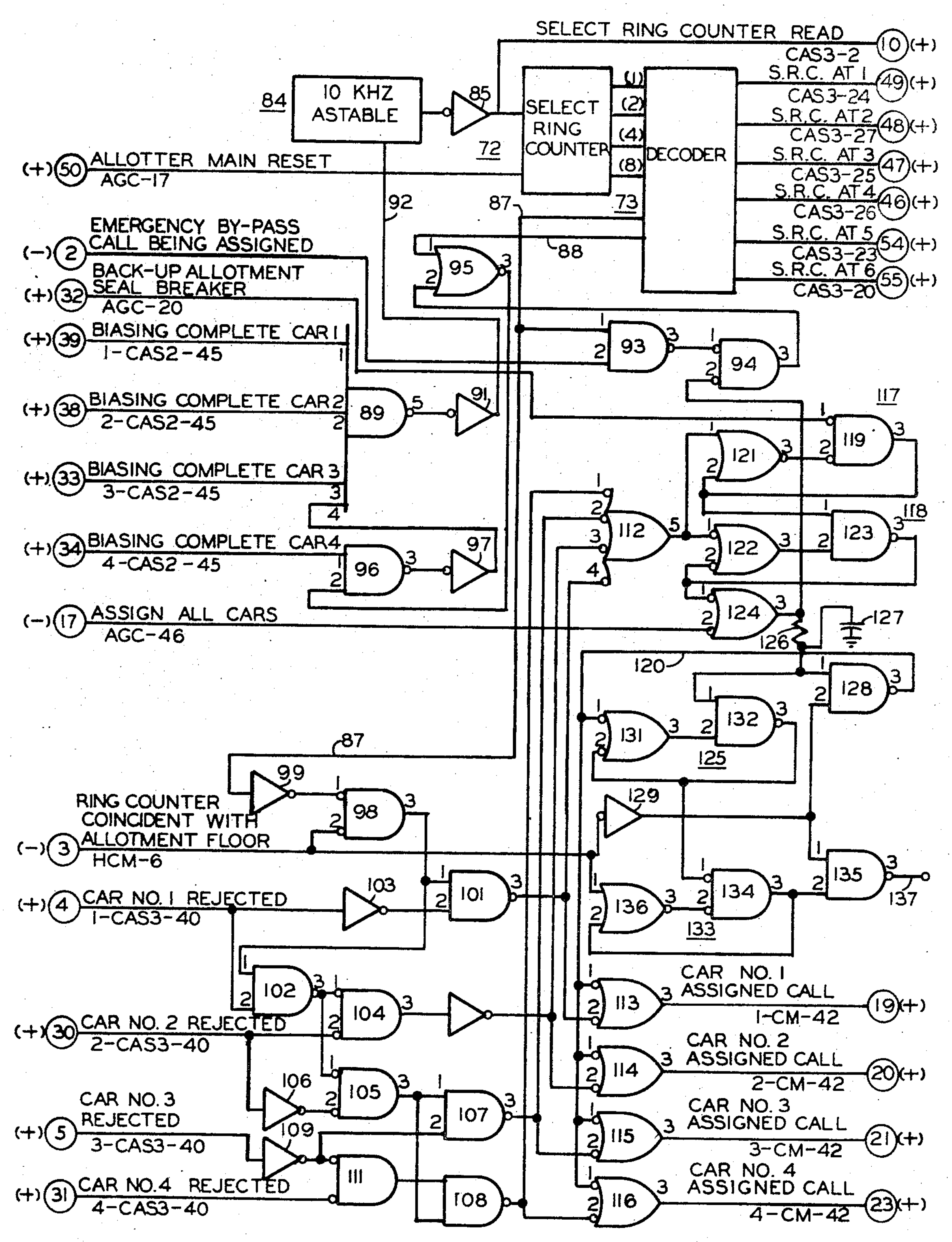
FIG. 2 is an abbreviated logic diagram for a four counter digital comparator for counters having six digit bits including a select ring counter and the sequencing controls for selecting only one counter.

The drawings have been presented as portions of an elevator control wherein FIG. 1 represents a portion of the control provided for each of a plurality of elevator cars termed a "car allotter section — board 3" CAS3 and FIG. 2 represents a section common to all of the cars termed the "select ring counter — no two car board" SRCN2. These elements of the system are utilized to issue a CAR ASSIGNED CALL signal for the car having the lowest count in a master binary counter 61 where that count represents traffic burden imposed on the car to delay its service to the call subject to allotment. Interconnections between FIGS. 1 and 2 and the controls of the elevator system not shown are made at terminals designated by circles containing terminal numbers and located at the ends of leads in the drawing margins. The source of signals to and the destination of signals from these terminals is noted by a board designation followed by a terminal number separated by a dash. True signals, those indicating the function of the short label adjacent the lead to each terminal are parenthetically indicated adjacent the terminal. In the text terminal signals will be designated by board symbol, terminal number and signal sign. Thus if car no. 1 is to be rejected, a signal CAS3–40+ (FIG. 1) signifying THIS CAR REJECTED would issue to SRCN2–4 as SRCN2–4+ (FIG. 2).

The above scheme of terminal and signal designation has been applied internally of each board to its several elements as NAND 66 of FIG. 1 having inputs 1 and 2 designated 66–1 and 66–2 and an output 3 designated 66–3. Where a signal is involved the sign follows the terminal designation.

In the drawings NAND and NOR gates are depicted by standard symbols as NAND 66 and NAND 74 respectively representing a two input and a three input gate employed for a logical "and" and a logical "or" function. NOR 98 is employed as an "and" in the logic. As is conventional, the NANDs issue a (+) when any input is (−) and a (−) when all inputs are (+) and the NORs issue a (−) when an input is (+) and a (+) when all inputs are (−). Typically, the gates, counters 61 and 72 and the inverters such as 77 are elements of integrated circuits, as those from Texas Instruments Incorporated, Post Office Box 5012, Dallas, Texas 75222, such as SN7400N, SN7410N, SN7420N and SN7430N NAND gates, SN7402 NOR units, SN7401N open collector NAND units sometimes employed as wired ORs, SN7493N binary counters, and inverters formed by either NANDs or NORs with appropriate external connections.

In addition to the illustrated sections of the elevator system with which this comparator functions, there are a number of sections referred to and not shown from which signals are derived or to which signals are issued. They are shown in more detail in the above noted Robaszkiewicz patent application as follows:

| Symbol | Short Function Title |
|---|---|
| AGC | Allotter Gating Circuit (one per system) |
| CAS1, CAS2 | Car Allotter Sections 1 and 2 (one each per car) |
| CM | Car Memory (one per car per floor) |
| HCM | Hall Call Memory (one per floor) |

Where the boards are individual to a car the source or destination for a signal is identified by the car number as a prefix to the terminal as 4–CAS2–45 at terminal SRCN2–34 indicating a signal from the CAS2–45 terminal of car 4. In the case of signals to car memories as from SRCN2–23 to those of car no. 4 it should be recognized that the signal is coupled to CM42 for each car memory of that car. Hall call memory terminals are interconnected for each floor's hall call memory as to SRCN2–3 from HCM–6 of each such memory.

A typical counter 61 of six binary stages is shown in FIG. 1. Pulses are applied at input 62 and in conventional binary numeration accumulate to represent counts containing (1), (2), (4), (8), (16) and (32) as labeled on the output leads extending from the right side of the rectangle 61. Corresponding circuits for three other counters with comparison gates and reject memories are represented by rectangles 63, 64 and 65.

The outputs of counter 61 are scanned in succession beginning with the most significant digit by enabling NAND gates individually associated with each digit as gates 71 through 66 respectively for the (1), (2), (4), (8), (16) and (32) counter outputs. A select ring counter 72 through decoder 73, FIG. 2, supplies positive going signals to the first input terminals of NANDs at terminals 24, 27, 25, 26, 23 and 20 of CAS3 for scan positions 1 through 6 respectively. These signals enable the corresponding NANDs of all cars' CAS3 circuits simultaneously so that any car counter 61 having a count to the corresponding bit will have its NAND gated to NAND 74 to apply an inhibiting 74–1– signal whereby 74–4+ represents a WANT TO REJECT THIS CAR signal. It will be assumed that the car is conditioned so that it can serve the call and has a CAS3–34+ CAR CANNOT ANSWER THIS CALL (not) signal (from sources not shown such as inspection service and by pass controls) to enable NAND 74. It will also be assumed that the reject memory comprising cross connected NANDs 75 and 76 is reset to issue a 75–3+ as an enabling 74–3+.

In the allotment process employing the digital comparator of this invention each allotment is initiated by an ALLOTTER MAIN RESET signal applied as CAS3–42+ to reset each car's master binary counter 61 and reject memory, and as SRCN2–50+ to reset the select ring counter 72. The reject memory reset NAND 75 responds to a 75–1– derived from inverter 77 when a reset signal is imposed.

The comparator progressively eliminates counter counts and thus elevator cars by setting reject memories 78 for those cars having a sensed count level provided at least one car does not have that count level. This is accomplished by a comparison of the outputs of NAND 74 for all cars by interconnecting those outputs, isolated by inverters 79 and 81, at the CAS3–43 terminals of all cars. The isolated interconnection causes all cars to have their CAS3–43 terminals effectively grounded or (–) if any car has its gate 74 gated to issue a 74–4–.

Reject memory set gate, NAND 82 is gated only when one or more cars have their gate 74 inhibited to issue a 74–4+ and impose an 82–3+ while one or more cars have their gate 74 gated to issue a 74–4–. The car or cars having their 74–4+ will be rejected under such circumstances since there will be a coincidence of (+) inputs to issue a 82–4– setting signal to set NAND 76 of reject memory 78. In the case of cars having a 74–4–, an 82–3– inhibits their setting NANDs 82 and they impose a CAS3–43– through their inverters 79 and 81 to their CAS3–43 and that of every other car. This results in each car having an 82–2+ since inverter 83 inverts the CAS3–43– signals. In the case of cars having a 74–4+, an 82–3+ enables their setting NANDs 82 since they are enabled by the 82–2+ derived from the inhibited cars. Gating can occur through NAND 82 only during the read interval of the select ring counter as applied from SRCN2–10 to CAS3–2 as a (+) signal for SELECT RING COUNTER READ.

When a car's reject memory 78 is set a 76–3+ issues as CAS3–40+ signifying THIS CAR REJECTED and is applied as SRCN2–4+.

The SRCN2 board of FIG. 2 includes a clocking means such as a 10KHZ astable 84 providing pulses through inverter 85 to select ring counter 72 and SRCN2–10 as (+) SELECT RING COUNTER READ pulses. A four stage binary counter 72 is illustrated with its (1), (2), (4) and (8) outputs coupled to binary to decimal decoder 73. Eight output signals are issued from the decoder, the first six being scanning signals as discussed for CAS3 and the seventh and eighth being sequencing signals on leads 87 and 88 respectively.

FIG. 2 also includes the control for initiating and terminating the select ring counter scan, the controls for insuring a preference in assignment in the event there are equally low counts in two or more counters, the controls for issuing the assignment signals and for correlating functions with an allotter scanner (not shown), and a failure control which releases the allotment cycle after a recycle with no selection being made.

The comparator functions are initiated when the counters 61 of all cars have received their counts, termed a "biasing complete", as signified by means not shown as a (+) signal at terminals 39, 38, 33 and 34 of SRCN2 for cars No. 1, No. 2, No. 3 and No. 4 respectively. Start NAND 89 is gated upon a coincidence of (+) inputs for all cars to issue 89–5– to inverter 91 and a (+) start signal on lead 92 to clock 84. The select ring counter 72 is advanced so decoder 73 in sequence issues (+) signals on its several outputs to scan the master binary counter bits of the cars. On the seventh scan position the clock 84 is stopped to permit the allotter master ring counter (not shown) to advance to the position of the allotment floor in a scan direction the same as the service direction of the call to be allotted at which time a (–) signal is applied at SRCN2–3 (by means not shown) to signify RING COUNTER COINCIDENT WITH ALLOTMENT FLOOR.

The system in which this comparator has been employed assigns hall calls to cars selected by the comparator only while a master ring counter which scans the floors served by the cars is at the scan position of the allotment call and is scanning in a direction the same as the allotment call. This scan condition is indicated when SRCN2–3 goes (–) and it persists for of the order of 125 microseconds. The assignment results in the setting of a demand memory (not shown) for the car and call and the resetting of a select memory which identified the allotment call during the allotment. When an allotment occurs in a normal sequence, it is completed during the initial portion of the interval of the SRCN2–3– signal and thereby cancels the signal to terminate the car assignment functions. If an allotment fails to take place, the SRCN2–3– signal terminates at the end of its full interval and on the next scan of the allotment floor the SRCN2–3– signal attempts to assign the allotment call to all cars. This assignment should be completed in an early portion of the SRCN2–3– interval and the allotment call select memory should be reset. If it is not made by the end of the normal interval, the system resets the select memory as the interval terminates. This is done to permit another select memory to be set and another call to be allotted.

The clock 84 is stopped when the seventh scan signal appears as 93–1+ on NAND 93 to gate a 93–3– to NOR 94. Assume there is normal operation and a (+) EMERGENCY BY-PASS CALL BEING ASSIGNED (not) signal is imposed at SRCN2–2 (by means not shown) to make 93–2+. NAND 93 is thus gated to impose 94–1–. Assume for the present that 94–2– is present, thus, 94–3+ is applied to NOR 95 causing it to issue a 95–3– until 94–2+ is applied. With NOR 95 issuing (–) it inhibits the clock 84 and scan advance by imposing its 95–3– as a 96–2– on NAND 96. NAND 96 issues a 96–3+ to inverter 97 to inhibit scan start NAND 89.

When the master ring counter for the allotter reaches the allotment floor while scanning in a direction the same as the allotment call service direction, SRCN2–3– is applied to NOR 98. The detent of the scan by stopping select ring counter 72 at the seventh scan position maintains lead 87 (+) and through inverter 99 imposes an enabling 98–1– so that when 98–2– is applied 98–3+ is issued to permit the assignment of the unrejected car by the comparator selection of the unrejected and thus lowest count counter. The higher count counters have set their signals CAR REJECTED as (+) on terminals 4, 30, 5 and 31 of SRCN2.

With the select ring counter scan of the master binary counter outputs completed and the master ring counter in the proper scan position, the assignment is made by enabling NANDs 101 and 102 with a 98–3+ to 101–1 and 102–1. NAND 101 is an assignment gate while NAND 102 is a sequencing gate. If car no. 1 is rejected, 101 is inhibited by inverter 103 applying the SRCN2–4+ signal as a 101–2– and a car lower in the sequence is considered by gating 102 by direct application of SRCN2–4+ as 102–2+. If car no. 1 was not rejected, its assignment is made by gating 101 when SRCN2–4– inverted by 103 imposes a 101–2+ while it directly inhibits 102 with a 102–2–. In similar fashion the next higher car is enabled by 102–3– to its assignment NOR 104 and its sequence NOR 105. If that car is not rejected, SRCN2–30– gates NOR 104 while inhibiting 105 through inverter 106. If no. 2 has been rejected, 105–3+ to assignment NAND 107 for car no 3. and assignment NAND 108 for car no. 4 are enabled. If no. 3 is rejected, inverter 109 makes 107–2– to inhibit its assignment by 107–3+ and NOR 111 is enabled so that if no. 4 is unrejected it will gate 108. If no. 3 is unrejected, inverter 109 inhibits NOR 111 to inhibit NAND 108 while 107–2+ gates 107 for assignment of car no. 3.

Any car when identified as not rejected in the comparator inhibits NAND 112 to signify that a selection has been made and assigns the call by gating its NAND 113, 114, 115 or 116 for cars 1, 2, 3 or 4 respectively. Assuming no malfunction a (+) signal is present on lead 120 to enable each of NANDs 113, 114, 115 and 116 at their first terminals so that the gating of 101, 104, 107 or 108 will gate the corresponding 113, 114, 115 or 116 at its second terminal. This results in a CAR ASSIGNED CALL signal at 19, 20, 21 or 23 for cars 1 through 4 respectively.

The selection of the unrejected car and resultant inhibiting of NAND 112 shifts 112–5 from (–) to (+) to permit the completion of the select ring counter scan by an advance of one scan position to position eight. This is accomplished in two steps to impose a 94–2+ and release the latch of gated NOR 94 so that 94–3– enables NOR 95 to enable NANDs 96 and 89. This permits the select ring counter to advance to its eighth position where the (+) on lead 88 again inhibits NOR 95. Two latch circuits 117 and 118 are employed in this two step process to first remember the turn on of the assignment pulse when SRCN2–3 goes (–) and second remember the transfer of SRCN2–3 to (+).

Assume a normal allotment so that SRCN2–32– represents a BACK-UP ALLOTMENT SEAL BREAKER (not) signal to enable NOR 119 with a 119–1–. Assignment NAND 112 issues a 112–5+ to NOR 121 at 121–1+ to make 121–3–. NOR 119 has 119–2– to make 119–3+ and latch 121 with a 121–2+ while a 123–1+ conditions NAND 123 to respond to the turn off of SRCN2–3–. When SRCN2–3+ appears 112–5 goes (–) with no effect on 121, however, 122–1– makes NAND 122 issue a 122–3+ to make 123–2+. Conditioned NAND 123 therefore issues 123–3– to latch 122 by 122–2– and cause 124–3 to shift from (–) to (+) by a 124–1–. This assumes there is no ASSIGN ALL CARS signal so SRCN2–17+ makes 124–2+. 124–3+ makes 94–2+ to release the astable detent for one pulse following which lead 88 goes (+) to again stop the astable 84 by making 95–3–.

Upon completion of an assignment of a car to an allotment call, the seals 117, 118 and those associated with the backup allotment functions to be discussed are broken by generating a (+) signal which is applied to SRCN2–32 as a BACK-UP ALLOTMENT SEAL BREAKER. This imposes a 119–1+ to release the seal on NOR 119 making 119–3– to release NAND 123 by a 123–1– to make 123–3+ to 124–1. NAND 124 issues 124–3– to similarly release the subsequent two latches and condition NOR 94 for subsequent assignments.

In a normal assignment of a car to an allotment call the operation of latch 118 occurs shortly after the operation of latch 117 and well before the master ring counter advances from the allotment call. If, however, the assignment does not take place and the allotment call continues throughout the scan interval, as where the identifying select memory is not reset, a third latch 125 is cocked to condition controls for assigning all cars to the allotment call. A resistance 126 and grounded capacitance 127 provide a time delay in applying the cocking signal 124–3+ to latch 125. This delay is of such length that SRCN2–3 has returned to (+) and removed its activating 128–2+ from NAND 128 before 128–1 goes + due to 124–3+. Thus in a normal assignment occurring shortly after SRCN2–3– appears NAND 128 is not gated.

If a normal assignment does not occur in the first master ring counter scan, then during the second scan, the signal SRCN2–3– through inverter 129 makes 128–2+ the retained 128–1+ (it will be recalled no BACK-UP ALLOTMENT SEAL BREAKER signal was issued) permits 128–3– to make lead 120 (–). This issues a CAR ASSIGNED CALL signal to each car so that each car is assigned the allotment call. The (–) signal on lead 120 causes NAND 131 to issue a 131–3+ to NAND 132 at 132–2 making 132–3–. This seals the assignment signal and passes a signal to latch 133. As in the first scan cycle, the allotment is normally completed early in the master ring counter scan interval so that SRCN2–3 goes (+) and the seals are broken by SRCN2–32+.

If the second allotment fails, the call is released from allotment by the sequencing of the fourth seal 133 when the master ring counter next scans to make SRCN2–3–

The return of SRCN2–3 to + at the end of the second scan of the allotment floor without any car being assigned to the allotment floor to break the back-up allotment seal leaves 128–1+ and 132–1+ from 124–3+, 131–3+ to 132–2+ sealing 132–3– to 131–2– to hold 134–1–. Also 136–1+ makes 136–3– so that 134–2– makes 134–3+ providing a seal as 136–2+. At this time 135–2+ has no effect since inverter 129 makes 135–1– and NAND 135 maintains its 135–3+ to terminal 137.

The third scan of the allotment floor by master binary counter makes SRCN2–3– to make 136–1– with no effect since 136–2+ holds 136–3–. However, inverter 129 makes 135–1+ coincident with 135–2+ to make 135–3–. This is an ALLOT A DIFFERENT CALL signal which, by means not shown simulates a completed allotment of the allotment call to reset its select memory.

The two phases of failure processing can be eliminated from many comparator functions which might utilize the system of this invention. Further, the comparator might be provided with no selection means to avoid a double acceptance as where two master binary counters have the same low count compared to the remainder of the binary counters.

The system of progressively scanning a plurality of like magnitude binary counter outputs or counts can be applied to counting systems operating on radices other than two where the scan progresses from the most significant to the least significant output or bit and rejection means are effective to reject counts having effective bits of a given level where other counts have those level bits ineffective where the lowest count is sought, and conversely, where the highest count is sought, by providing rejection means effective to reject counts having ineffective bits at levels where other counts have effective bits. The largest count could be selected by modifying the present system in FIG. 1 for each counter by interposing an inverter immediately preceding terminal 74–1 of each reject NAND 74.

In view of the above variants and the utility of the present invention in varying degrees of refinement, particularly as applied to an elevator control where comparator functions are coordinated with floor scanning and call assignment functions, it is to be understood that the above disclosure of the present invention is intended as illustrative and is not to be read in a limiting sense.

I claim:

1. A multiple digital comparator for ascertaining the extreme count among greater than two digital counts each expressed as bits for a given radix comprising means for time sequentially scanning a plurality of the count bits in an order for the most significant bit to the least significant bit, each significant bit being considered simultaneously with all bits of like significance for the several counts; and means responsive to the presence of a bit of a given significance for one or more counts and the absence of a bit of said given significance for one or more counts to reject from further consideration those counts having a given state for said bit of a given significance.

2. A combination according to claim 1 wherein said given radix is two and said bits are binary count bits.

3. A combination according to claim 1 wherein said extreme is the lowest count and wherein said given state is the presence of said bit of a given significance.

4. A combination according to claim 1 wherein said extreme is the highest count and wherein said given state is the absence of said bit of a given significance.

5. A combination according to claim 1 wherein the plurality of count bits is all count bits.

6. A combination according to claim 1 including means responsive upon the completion of the scan of count bits to undertake a review of the rejected and unrejected counts.

7. A combination according to claim 6 including means to issue a signal for the first unrejected count encountered in the order of review.

8. A combination according to claim 7 including means to terminate said review in response to the first unrejected count encountered in the order of review.

9. A combination according to claim 8 wherein said counts each represent service burden imposed upon an elevator car and including means responsive to said issued signal to assign a service burden on the elevator represented by the unrejected count.

10. A combination according to claim 1 including a plurality of binary counters each having a plurality of output terminals upon which said count bits are represented; a bit gate individual to each output terminal; said means for scanning applying enabling signals to said gates whereby gates for like bit levels of said plurality of counters are simultaneously enabled to issue a signal indicative of the presence or absence of said bit; a master gate for each counter responsive to each of said bit gates for its respective counter; said reject means including a memory for its respective counter; a set gate for each respective counter for setting said memory responsive to the master gate for said counter being in a first state and the master gate of another counter being in a second state to set said memory to reject said respective count.

11. A combination according to claim 10 wherein said master gate is gated by the presence of a bit for the currently scanned bit gate and said set gate sets said memory when said respective master gate is gated and another master gate is inhibited whereby the rejected count is greater than remaining unrejected counts.

12. A combination according to claim 10 wherein said master gate is gated by the absence of a bit for the currently scanned bit gate and said set gate sets said memory when said respective master gate is gated and another master gate is inhibited whereby the rejected count is less than the remaining unrejected counts.

13. A combination according to claim 10 wherein said scanner includes means to define discrete read intervals for enabling said bit gates; and including means to enable said set gates for each memory only during said read intervals.

14. A combination according to claim 10 wherein each memory has an output; including an assignment gate for each counter having two inputs one of which is coupled to said output and enables said gate for a first signal state; an advance sequence gate for each counter having two inputs one of which is coupled to said output and enables said gate for a second input state opposite said first state; common couplings to the second inputs of said assignment and advance gates for each counter; a first enabling means responsive to the completion of scan of said bit gates coupled to the common coupling for a first counter; and a coupling from each advance gate to a common coupling of a counter succeeding said first counter in a predetermined order whereby counters having equal extreme counts are subject to operation of their assignment gate in a predetermined order.

15. A combination according to claim 10 including means responsive to the completion of the scan of said bit gates to inhibit advance of said scanner and means responsive to the setting of a memory of a counter to advance said scanner.

16. A combination according to claim 10 including first failure means responsive to failure to set a memory of any counter to set said memories of all counters.

17. A combination according to claim 16 including means responsive to failure to set the memories of any counter following operation of said first failure means to enable the reset of all counters.

18. A combination according to claim 10 for an elevator system including a plurality of cars serving a plurality of floors and wherein said counters are each individual to a car to indicate by their count a service capacity of said car with respect to a floor; said combination including a floor scanner; means responsive to the completion of the scan by said first mentioned bit gate scanner to inhibit advance of said bit gate scanner; and means responsive to the coincidence of said floor scanner with the floor to which said service capacity of said counts relative to advance said bit gate scanner.

* * * * *

UNITED STATES PATENT OFFICE
CERTIFICATE OF CORRECTION

Patent No. 3,731,765 Dated May 8, 1973

Inventor(s) Gerald D. Robaszkiewicz

It is certified that error appears in the above-identified patent and that said Letters Patent are hereby corrected as shown below:

Column 10, line 25, "relative" should be -- relate -- .

Signed and sealed this 8th day of October 1974.

(SEAL)
Attest:

McCOY M. GIBSON JR.
Attesting Officer

C. MARSHALL DANN
Commissioner of Patents